(12) United States Patent
Nowak et al.

(10) Patent No.: US 6,312,214 B1
(45) Date of Patent: Nov. 6, 2001

(54) METHOD FOR IMPROVING SAFETY

(75) Inventors: John A. Nowak, Chesterfield Township; Scott Gentry, Garden City; Daniel R. Primeau, Canton, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/544,418

(22) Filed: Apr. 6, 2000

(51) Int. Cl.$^7$ ................................................. E01F 13/00
(52) U.S. Cl. .................................................. 414/809; 49/49
(58) Field of Search ................................ 414/809, 401; 49/49

(56) References Cited

U.S. PATENT DOCUMENTS

| | | | |
|---|---|---|---|
| 4,122,629 | * 10/1978 | Rennick | 49/357 |
| 4,127,856 | * 11/1978 | Bickel | 340/687 |
| 4,630,989 | * 12/1986 | Davey | 414/401 |
| 4,818,170 | * 4/1989 | Fisher et al. | 414/401 |
| 5,927,928 | * 7/1999 | Hageman et al. | 414/401 |
| 5,964,059 | * 10/1999 | Metz | 49/49 |

* cited by examiner

*Primary Examiner*—Steven A. Bratlie
(74) *Attorney, Agent, or Firm*—Jerome Drouillard

(57) ABSTRACT

A apparatus for improving loading dock safety includes an actuator 22 coupled to light 16. Actuator 22 controls the position of a visible barrier 24, or flag. When semi-truck 12 is being unloaded, it is unsafe to move semi-truck 12 ahead, therefore, red light 18 is activated and actuator 22 lowers barrier 24 in front of the truck where the driver can see it. When the unloading process is complete, it is safe to move semi-truck 12 ahead, therefore, green light 20 is activated and actuator 22 raises barrier 24 to signal the driver that semi-truck 12 may be safely moved ahead.

7 Claims, 1 Drawing Sheet

METHOD FOR IMPROVING SAFETY

TECHNICAL FIELD

The present invention relates generally to automotive assembly methods and, more particularly, to a method for improving loading dock safety.

BACKGROUND ART

In order to remain successful, any industry that produces consumer goods must constantly monitor safety. If the actual or perceived safety of an assembly plant is lower than worker expectations, then workers will find alternative, safer industries to work in. Therefore, it is in the best interest of producers of consumer goods to constantly strive to improve the safety of their assembly plants.

In order to keep an assembly plant functioning, large amounts of various parts must be delivered on a frequent basis. The method of choice for delivery of these various parts is by semi-truck. When the semi-truck arrives with these parts it backs up to a loading dock to allow a forklift to unload its cargo. Unfortunately, if the truck pulls away from the dock before the unloading process is complete, then the forklift may fall on the ground.

In the past, a light was provided to notify the semi-truck driver of the status of his load. When the light is red, the unloading process is occurring, and the driver should not pull away. When the light is green, the unloading process is complete, and it is safe for the driver to pull forward. Unfortunately, the light is not always easy to see from the cab of the semi-truck. This results in the driver occasionally pulling away before the unloading process is complete.

The disadvantages associated with conventional loading dock techniques have made it apparent that a new technique for improving loading dock safety is needed. The new technique should prevent semi-drivers from pulling away from the loading dock before the unloading process is complete.

SUMMARY OF THE INVENTION

It is an object of the invention to provide an improved and reliable means for improving loading dock safety. Another object of the invention is to prevent semi-drivers from pulling away from the loading dock before the unloading process is complete.

In accordance with the objects of this invention, a method for improving loading dock safety is provided. In one aspect of the invention, an apparatus for improving loading dock safety includes an actuator coupled to a stop/go light. Actuator controls the position of a visible barrier, or flag. When the semi-truck is being unloaded, it is unsafe to move the semi-truck ahead, therefore, a red light is activated and the actuator lowers the barrier in front of the truck where the driver can see it. When the unloading process is complete, it is safe to move the semi-truck ahead, therefore, a green light is activated and the actuator raises the barrier to signal the driver that the semi-truck may be safely moved ahead.

The present invention achieves an improved and reliable means for improving loading dock safety. Also, the present invention is advantageous in that it reduces damage caused by semi-truck drivers pulling away from the loading dock before the unloading process is complete.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODE(S) FOR CARRYING OUT THE INVENTION

Figure 1:
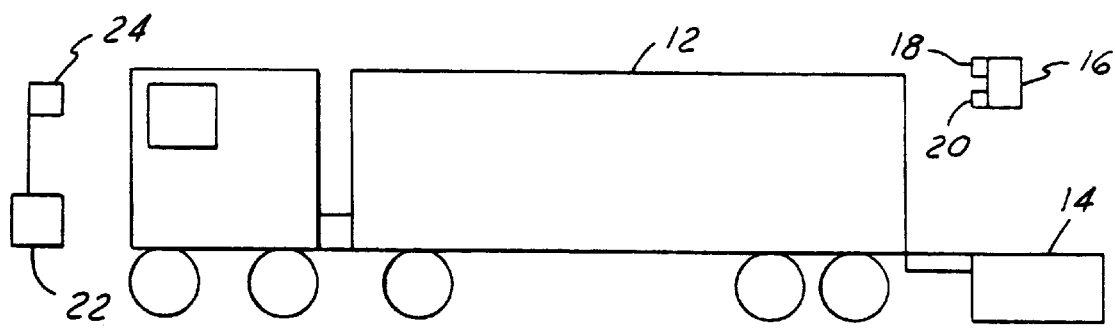
FIG. 1 is a depiction of a system for improving loading dock safety according to one embodiment of the present invention.

In the following figures, the same reference numerals will be used to identify identical components in the various views. The present invention is illustrated with respect to improving loading dock safety, particularly suited for the automotive field. However, the present invention is applicable to various other uses that may require improved loading dock safety.

Referring to FIG. 1, a system for improving loading dock safety 10 according to one embodiment of the present invention is illustrated. System 10 includes a semi-truck 12 backed up to a loading dock 14. Loading dock 14 is coupled to a stop/go light 16. Stop/go light 16 includes a red light 18 and a green light 20. Red light 18 is activated during an unloading process when semi-truck 12 is locked to loading dock 14. Green light 20 is activated when the unloading process is complete and semi-truck 12 is no longer locked to loading dock 14.

In one aspect of the present invention, an actuator 22 is coupled to existing light 16. Actuator 22 controls the position of a visible barrier 24, or flag. When semi-truck 12 is being unloaded, it is unsafe to move semi-truck 12 ahead, therefore, red light 18 is activated and actuator 22 lowers barrier 24 in front of the truck where the driver can see it. When the unloading process is complete, it is safe to move semi-truck 12 ahead, therefore, green light 20 is activated and actuator 22 raises barrier 24 to signal the driver that semi-truck 12 may be safely moved ahead. In this way, loading dock safety is improved.

Figure 2:
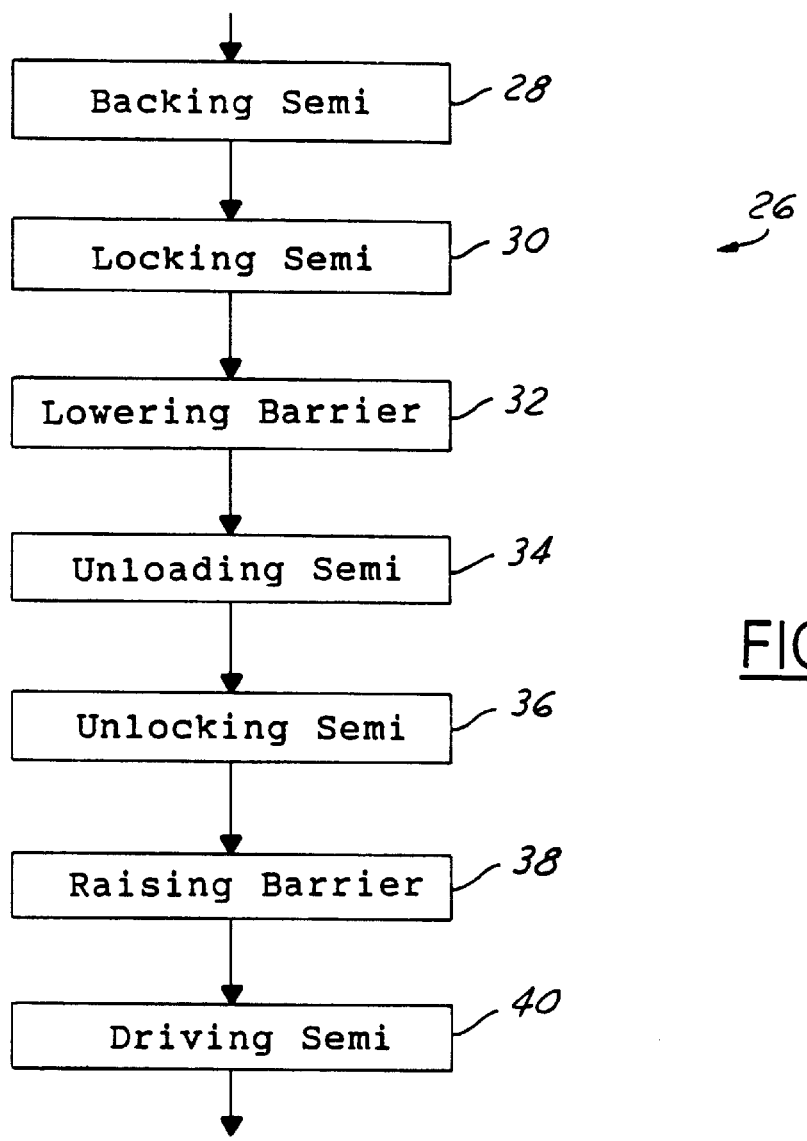
FIG. 2 is a block diagram of a method for improving loading dock safety according to one embodiment of the present invention.

Referring to FIG. 2, a block diagram of a method 26 for improving loading dock safety according to one embodiment of the present invention is illustrated. In operation, the sequence begins with step 28 by backing semi-truck 12 up to loading dock 14. The sequence then proceeds to step 30 where semi-truck 12 is locked to loading dock 14, such that semi-truck 12 is firmly coupled to loading dock 14.

Once semi-truck 12 is firmly coupled to loading dock 14, the sequence proceeds to step 32 where red light 18 is activated and barrier 24 is lowered such that it is visible to the semi-truck driver. The sequence then proceeds to step 34 where semi-truck 12 is unloaded. In one aspect of the invention, the process of unloading involves driving a fork lift into semi-truck 12 and unloading a plurality of parts using the fork lift. When semi-truck 12 is completely unloaded the sequence proceeds to step 36.

In step 36, semi-truck 12 is unlocked from loading dock 14 such that semi-truck 12 is no longer firmly coupled to loading dock 14. The sequence then proceeds to step 38 where green light 20 is activated and red light 18 is deactivated while barrier 24 is raised. In step 40, the driver may then drive semi-truck 12 away from loading dock 14.

The method and system of the present invention prevents semi-drivers from pulling away from the loading dock before the unloading process is complete. The present invention also reduces damage caused by semi-truck drivers pulling away from the loading dock while the locks are still engaged.

From the foregoing, it can be seen that there has been brought to the art a new and improved method for improving loading dock safety. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. A method for improving loading dock safety comprising the steps of:

backing a semi-truck up to a loading dock;

locking said semi-truck to said loading dock, whereby said semi-truck is coupled to said loading dock;

lowering a barrier such that said barrier is visible to a semi-truck driver;

unloading said semi-truck;

unlocking said semi-truck from said loading dock, whereby said semi-truck is no longer coupled to said loading dock;

raising said barrier; and driving said semi-truck away from said loading dock.

2. The method for improving loading dock safety as recited in claim 1, further comprising the step of activating a red light when said semi-truck is coupled to said loading dock.

3. The method for improving loading dock safety as recited in claim 1, further comprising the step of activating a green light when said semi-truck is no longer coupled to said-loading dock.

4. The method for improving loading dock safety as recited in claim 1, wherein said barrier is a flag.

5. The method for improving loading dock safety as recited in claim 1, wherein the step of lowering a barrier such that said barrier is visible to a semi-truck driver comprises lowering a barrier such that said barrier blocks said semi-truck.

6. The method for improving loading dock safety as recited in claim 1, wherein the step of unloading said semi-truck comprises driving a fork lift into said semi-truck to unload a plurality of parts.

7. A method for improving loading dock safety comprising the steps of:

backing a semi-truck up to a loading dock;

locking said semi-truck to said loading dock, whereby said semi-truck is coupled to said loading dock;

lowering a barrier, in response to said locking said semi-truck, such that said barrier is visible to a semi-truck driver;

unloading said semi-truck;

unlocking said semi-truck from said loading dock, whereby said semi-truck is no longer coupled to said loading dock;

raising said barrier in response to said unlocking said semi-truck; and driving said semi-truck away from said loading dock.

* * * * *